United States Patent
Cho

(10) Patent No.: US 6,649,079 B2
(45) Date of Patent: Nov. 18, 2003

(54) COMPOSITION OF REFRIGERANT MIXTURES FOR LOW BACK PRESSURE CONDITION

(75) Inventor: Seung-Yon Cho, Daejeon-si (KR)

(73) Assignee: ACM Tech, Seoul (KR)

(*) Notice: Subject to any disclaimer, the term of this patent is extended or adjusted under 35 U.S.C. 154(b) by 0 days.

(21) Appl. No.: 10/363,249

(22) PCT Filed: Sep. 6, 2001

(86) PCT No.: PCT/KR01/01506

§ 371 (c)(1),
(2), (4) Date: Mar. 5, 2003

(87) PCT Pub. No.: WO02/20689

PCT Pub. Date: Mar. 14, 2002

(65) Prior Publication Data

US 2003/0178597 A1 Sep. 25, 2003

(30) Foreign Application Priority Data

Sep. 6, 2000 (KR) .......................... 2000-52675

(51) Int. Cl.$^7$ ................................. C09K 5/04
(52) U.S. Cl. ........................................ 252/67
(58) Field of Search ........................... 252/67

(56) References Cited

U.S. PATENT DOCUMENTS

| 5,444,102 A | * | 8/1995 | Nimitz et al. ............... 521/131 |
| 5,624,595 A | | 4/1997 | Sato et al. |
| 5,900,185 A | * | 5/1999 | Tapscott ....................... 252/67 |
| 6,001,273 A | | 12/1999 | Minor et al. |

FOREIGN PATENT DOCUMENTS

| EP | 0 761 796 | 3/1997 |
| JP | 11-199863 | 7/1999 |

OTHER PUBLICATIONS

Machine translation of JP 11–199863, Jul. 1999.*

* cited by examiner

Primary Examiner—John R. Hardee
(74) Attorney, Agent, or Firm—Bachman & LaPointe, P.C.

(57) ABSTRACT

There is provided a composition of refrigerant mixtures for low back pressure condition, comprising isobutane, 1,1-difluoroethane and, optionally, additive selected from the group consisting of carbon oxide, trifluoromethyl iodide and mixture thereof. The composition according to the present invention is environment-friendly and can be directly drop in the conventional refrigerator system adopting CFC-12 refrigerant without any systemic change.

3 Claims, No Drawings

COMPOSITION OF REFRIGERANT MIXTURES FOR LOW BACK PRESSURE CONDITION

FIELD OF THE INVENTION

The present invention relates to a composition of refrigerant mixtures for low back pressure condition, which is environment-friendly and can be directly dropped in the conventional refrigerator system adopting CFC-12 refrigerant without any systemic change such that it can be effectively used as a substitution material for Freon refrigerant CFC-12 which is the main cause of ozone layer destroy and green house effect of earth. More specifically, the present invention relates to the composition of refrigerant mixtures for low back pressure condition, containing isobutane, 1,1-difluoroethane, and, optionally an additive. The composition according to the present invention is environmentally friendly, therefore minimizes destroy of the ozone layer and global green house effect. Further, it has many excellent properties such as high volumetric-cooling capacity or the vapor pressure similar with CFC-12 to minimize the systemic modification of the refrigerator systems adopting Freon refrigerant CFC-12, and azeotropic characteristic to minimize the temperature grade during evaporation and condensation processes.

DESCRIPTION OF THE BACKGROUND ART OF THE INVENTION

Refrigerating cycle is composed of a compressor, a condenser, an evaporator, an expansion valve, a dryer, an oil separator, a liquid separator, and so forth. Based on the $2^{nd}$ law of thermodynamics, the refrigerator absorbs heat from the low heat supply and emits it to the high heat supply with the assistance of the compressor's work. Refrigerant used in the refrigeration cycle absorbs the heat from the surrounding and evaporates in the evaporator under the low temperature. In the compressor, the refrigerant is compressed to the gas having high temperature and high pressure and then, it is cooling again in the condenser and the phase thereof is changed to the liquid having high pressure. Finally, the pressure thereof is decreased to the initial value on passing through the expansion valve. During these cycles, the heat is transferred from the low heat supply, i.e., surrounding to the high heat supply and the refrigerant performs continuous cooling of the surrounding.

According to operation temperature, the refrigerant is classified into 3 classes: a refrigerant for low back pressure condition, a refrigerant for high back pressure condition, and a refrigerant for middle back pressure condition. The refrigerant for low back pressure condition operates at a temperature of $-35 \sim -15°$ C. The refrigerant for middle back pressure condition and the refrigerant for high back pressure condition are $-15 \sim +5°$ C. and $-10 \sim +10°$ C., respectively. As a representative example of the refrigerant for low back pressure condition, CFC-12 ($CF_2Cl_2$, simply, R-12), one of CFC (Chlorofluorocarbon) refrigerant, can be mentioned. Due to its high coefficient of performance and low flammability, CFC-12 has being widely used in small refrigerators such as household and industrial air-conditioner. However, the use thereof is strictly restricted for being a main cause of ozone layer destroy and global green house effect.

For these reasons, the development of CFC-12 substitution refrigerants has been continuously progressed. HFC (Hydrofluorocarbon) refrigerants such as HFC-134a (or R-134) or HFC-152a (or R-152a), azeotropic refrigerants such as R-500, HC (Hydrocarbon) refrigerants such as R-600a, and an organic compound ammonia ($NH_3$) were suggested as substitution refrigerants for CFC-12.

HFC refrigerants have been widely used as a substitution refrigerant for CFC-12, but there are questions as to the environmental safety of such HFC's. Especially, since HFC-134a ($CH_2FCF_3$), most widely used among HFC refrigerants, has lower volumetric cooling capacity and coefficient of performance with high compressing ratio than CFC, it consumes more electricity than CFC-12 refrigerant does. Because of its poor compatibility with a refrigerating oil, special oils like ester oils or poly alkylene glycol (PAG) oils are necessarily required rather than mineral oils. However, the ester oils or PAG oils may cause significant damages to a refrigerator by the absorption of moisture when they are exposed to the air. For these reasons, they cannot be directly dropped in the refrigerator systems adopting CFC-12 refrigerant. That is, systemic changes of the conventional refrigerator systems such as a compressor and the manufacturing equipments are necessarily required. Also, the HFC refrigerants are not environment-friendly. Specifically, the global warming potential (GWP) of HFC-134a is about 300 ($CO_2=1$, 100 yr), which is very high.

Although R-500 ($CF_2Cl_2/CHF_2Cl_2$) is an excellent refrigerant showing azeotropic behavior, which is a mixture of 2 kinds of refrigerants but acts as a single refrigerant, the use thereof is also restricted because it contains Freon refrigerant which causes environmental pollution and destroys ozone layer.

The hydrocarbon refrigerants have been actively researched as a substitution refrigerant for CFC-12, because of its excellent thermodynamic properties and low global warming potential, specifically 3 ($CO_2=1$, 100 yr). For instance, isobutane, R600a refrigerant is suggested as a refrigerator for use in household. Despite of its excellent thermodynamic properties, it suffers from disadvantages that it requires systemic changes or modifications of the CFC-12 refrigerator systems such as a compressor because of its low volumetric cooling capacity. Further, it may also be susceptible to flammability and explosiveness. In addition, R-290 (propane) having high. volumetric cooling capacity, which is one of the refrigerant for high back pressure condition, cannot be directly dropped in the conventional refrigerators because it has much higher vapor pressure than CFC-12. Non-azeotropic refrigerant containing mixture of isobutane and propane is also suffered from non-azeotropic behavior showing 5~6° C. of temperature grade during condensing and evaporating processes as well as flammability and explosiveness.

In addition, ammonia ($NH_3$) shows excellent refrigerant feature in cooling capacity, but it is a poisonous gas and susceptible to flammability and explosiveness. Further, it erodes copper and its alloy by the absorption of moisture. Therefore, it cannot be used in the refrigerator for use in household.

Meanwhile, U.S. Pat. No. 5,624,595 disclosed a refrigerant composition comprising silicone oil as an additive in order to improve flammability of the refrigerant. However, the amount of silicone oil added is strictly restricted because it circles through the refrigerating cycle as liquid state and reduces the cooling capacity and accumulation thereof in the evaporator may cause significant damages to the refrigerator. Further, since it is separated from the refrigerant while it is stored for a long time after being manufactured, the improvement in flammability is relatively low when the real refrigerant is discharged as a gas from the vessel.

As a result, in order to use the refrigerants suggested in the above, systemic changes or modifications of the refrigerator systems adopting CFC-12 refrigerant is necessarily required for the reason that they have different properties than CFC-12 in terms of cooling capacity, condensing pressure, evaporating pressure, and so forth. This systemic changes waste enormous cost and resources and the cost required for modifying manufacturing equipments is incalculably high.

Therefore, it has been demanded to develop new azeotropic refrigerant, which could be directly dropped in the conventional refrigerator systems in which CFC-12 was used as a refrigerant such that systemic changes can be minimized, which has excellent volumetric cooling capacity, high performance coefficient, and evaporating pressure feature without showing temperature grade during evaporating and condensing processes, and which is compatible with components of the refrigerator system such as refrigerating oil.

SUMMARY OF THE INVENTION

Therefore, the object of the present invention is to provide a composition of refrigerant mixture for low back pressure condition, which is environmentally friendly and is applied, with the adjustment of the amount of the refrigerant, directly to the conventional refrigerator systems adopting CFC-12 refrigerant without any systemic change.

Another object of the present invention is to provide a composition of refrigerant mixture for low back pressure condition which has excellent coefficient of performance and safety to environment and human, condensing and evaporating pressures almost identical to that of CFC-12, excellent compatibility with a refrigerating oil, and enhanced non-flammability and non-explosiveness.

The objects and other objects described in the description can be achieved by providing a composition of refrigerant mixture for low back pressure condition, containing isobutane and 1,1-difluoroethane, and optionally an additive which increases non-flammability.

According to the first aspect of the present invention, there is provided a composition of refrigerant mixture for low back pressure condition containing isobutane and 1,1-difluoroethane.

According to the second aspect of the present invention, there is provided a composition of refrigerant mixture for low back pressure condition containing 25~35 wt % of isobutane and 65~75 wt % of 1,1-difluoroethane.

According to the third aspect of the present invention, there is provided a composition of refrigerant mixture for low back pressure condition isobutane and 1,1-difluoroethane and an additive selected from the group consisting of carbon dioxide ($CO_2$), trifluoromethyl iodide ($CF_3I$) and mixture thereof to increase non-flammability.

According to the fourth aspect of the present invention, there is provided a refrigerator system comprising as a refrigerant the composition of refrigerant mixture for low back pressure condition.

DETAILED DESCRIPTION OF THE INVENTION

The present invention relates to a composition of refrigerant mixture for low back pressure condition, which is environment-friendly and can be directly dropped in refrigerator systems adopting CFC-12 refrigerant, which is main cause of destruction of ozone layer and of induction of green house effect of earth.

The composition according to the present invention contains azeotropic mixture of isobutane and 1,1-difluoroethane, and optionally an additive which improves non-flammability.

More specifically, the composition according to the present invention contains 25~35 wt % of hydrocarbon refrigerant isobutane and 65~75 wt % of HFC refrigerant 1,1-difluoroethane ($CHF_2CH_3$), and optionally less than 5 wt % of an additive, which is selected from the group consisting of carbon dioxide ($CO_2$), trifluoromethyl iodide ($CF_3I$) and mixture thereof in order to improve non-flammability, based on the total weight of refrigerant mixture.

According to the particular preferred embodiment of the present invention, a composition of refrigerant mixture for low back pressure condition comprising 29~31 wt % of isobutane, 68~70 wt % of 1,1-difluoroethane, 1~2 wt % of an additive selected from the group consisting of carbon dioxide ($CO_2$), trifluoromethyl iodide ($CF_3I$), and mixture thereof gave most preferred result.

The additive, carbon dioxide ($CO_2$) or trifluoromethyl iodide ($CF_3I$), which is used to prevent flammability of the hydrocarbon refrigerant, has additional role to improve volumetric cooling capacity and mobility of the refrigerant oil in the evaporator. According to another preferred embodiment of the present invention, addition of 1.5 wt % and 5 wt % of the additive to the refrigerant mixture raised the ignition point of the refrigerant composition to about 745~725° C. and to about 830~850° C., respectively, and the ignition point was increased in proportional to the content thereof. However, since the excess content of the carbon dioxide ($CO_2$) and/or trifluoromethyl iodide ($CF_3I$) could lower the cooling capacity, it is desirable for the composition to contain less than 5 wt % of the additive, based on the total weight of refrigerant mixture.

The composition according to the present invention can be prepared by removing air from an airtight vessel with a vacuum pump, followed by introducing the hydrocarbon refrigerant isobutane [$CH(CH_3)_3$] and HFC refrigerant 1,1-difluoroethane into the vessel and mixing the refrigerant mixture for a certain time. If necessary, carbon dioxide ($CO_2$) and trifluoromethyl iodide ($CF_3I$) can be added to the mixture in order to prevent flammability of the hydrocarbon refrigerant and to increase mobility of the refrigerating oil in the evaporator and volumetric cooling capacity of the refrigerant composition. The obtained product can be put into valve-equipped gas vessels and shipped. These processes can be performed at normal temperature.

According to the preferred embodiment of the present invention, the composition according to the present was proven to have high coefficient of performance and volumetric cooling capacity. As thus, it can be widely used in the refrigerator systems composed of a compressor, a condenser, and an expansion valve, and an evaporator. It can be also used in refrigerator systems equipped with an oil separator and a liquid separator additionally. Especially, the composition exhibits similar behaviors with CFC-12 in terms of vapor pressure, such that it can be directly dropped without any systemic change or modification in the conventional refrigerator systems in which CFC-12 is used as a refrigerant, comprising reciprocal, rotary or scrolling compressor.

In addition, since the composition according to the present invention is environment-friendly and no harm to the ozone layer and green house effect of earth, disadvantages resulted from CFC-12, HFC and HCFC refrigerant compositions can be avoided.

Further, since the composition has the excellent compatibility with the refrigerating oil which is used in order to prevent the abrasion of the parts such as a compressor, various refrigerating oils defined in the standard (ISOVG 10~50) of the International Standards Organization (ISO) can be widely used. Especially, differently from HFC-134a, mineral oils, which have been used most widely, can be used as a refrigerating oil.

The composition according to the present invention is also applicable to the refrigerators adopting the heat pump method, where the heat emitted from the condenser of the refrigerating cycle is used as the heating source. For example, the composition can be applied to the heat pump air-conditioner, which can be used for heating and cooling, by obtaining heat from the air in an evaporator located in the outdoor, and then warming the air in the indoor with the heat emitted from a condenser.

The present invention will be described in more detail referring to the following Examples, but it should be understood that the scope of the present invention is not limited thereto.

EXAMPLE

Example 1

Five compositions of refrigerant mixture for low back pressure condition were prepared by the method described above. The formulations are summarized in the Table 1:

TABLE 1

| Recipe | $CH(CH_3)_3$ | $CHF_2CH_3$ | ADDITIVE $CO_2$ | $CF_3I$ |
|---|---|---|---|---|
| Recipe 1 (SR-10a) | 29.5 | 69.0 | 1.5 | 0 |
| Recipe 2 (SR-10b) | 29.5 | 69.0 | 0 | 1.5 |
| Recipe 3 (SR-10c) | 30.0 | 70.0 | 0 | 0 |
| Recipe 4 (SR-10d) | 24.6 | 73.9 | 1.5 | 0 |
| Recipe 5 (SR-10e) | 34.5 | 64.0 | 0 | 1.5 |

Example 2

The thermodynamic properties of the recipes 1 to 5 (hereinafter, SR-10a to 10e) obtained from Example 1, such as boiling point, toxicity data, ignition temperature, thermal conductivity, heat of evaporation, ozone layer destroy potential (ODP), and global warming potential (GWP) were measured and compared to CFC-12, HFC-134a, HFC-152a, and R-600 in Table 2:

TABLE 2

| | Refrigerant | | | | | | | | | |
|---|---|---|---|---|---|---|---|---|---|---|
| Item | R12 | R134a | R152a | R600a | R290 | SR-10a | Sr-10b | SR-10c | SR-10d | SR10e |
| Chemical formula | $CF_2Cl_2$ | $CH_2FCF_3$ | $CHF_2CH_3$ | $C_4H_{10}$ | $C_4H_8$ | HC-mixture | HC-mixture | HC-mixture | HC-mixture | HC-mixture |
| Molecular Weight | 120.9 | 102.0 | 66.1 | 58.1 | 44.1 | 63.3 | 65.7 | 63.7 | 63.7 | 65.7 |
| Boiling Point (° C.) | −29.8 | −26.5 | −24.0 | −11.7 | −42.1 | −20.3 | −20.5 | −20.3 | −20.9 | −19.7 |
| Toxicity | none | none | none | none | none | none | none | none | none | none |
| Ignition Temperature | none | None | 680 | 460 | 470 | 725 | 745 | 615 | 735 | 735 |
| Thermal conductivity (W/m K) | | | | | | | | | | |
| Liquid | 0.08 | 0.0938 | 0.118 | 0.1064 | 0.1064 | 0.115 | 0.115 | 0.115 | 0.115 | 0.114 |
| Vapor | 0.0089 | 0.0118 | 0.0124 | 0.0146 | 0.0163 | 0.013 | 0.013 | 0.013 | 0.013 | 0.013 |
| Heat of Vapor (kJ/kg) [at 0° C.] | 149.8 | 198.7 | 307.1 | 355.7 | 374.5 | 303.0 | 298.0 | 298.0 | 319.0 | 324.0 |
| Refrigerating Oil | Mineral | Ester | Mineral | Mineral | Mineral | Mineral | Mineral | Mineral | Mineral | Mineral |
| ODP | 1 | 0 | 0 | 0 | 0 | 0 | 0 | 0 | 0 | 0 |
| GWP ($CO_2$ = 1, 100 yr) | 6900 | 1300 | 140 | 3 | 3 | 96 | 97 | 99 | 105 | 92 |

As shown in Table 2, the compositions according to the present invention, SR-10a to 10e could contain mineral oil as a refrigerating oil and had zero value of ODP and 96~97 of GWP which are very excellent, and higher ignition point compared to the hydrocarbon refrigerants (R-600a, R-290). In addition, they were non-toxic and had excellent heat transfer characteristic, and had low molecular weight such that the amount added can be reduced.

Example 3

The characteristics of SR-10a to 10e prepared in Example 1 were calculated with NIST program and compared to those of CFC-12, HFC-134a, R-600a, and R600a/R290(40/60). The results thereof were summarized in Table 3 (The volumetric efficiency of the compressor is assumed to 100%).

TABLE 3

Theoretical performance of refrigerants in ASHRAE LBP conditions

|  | R12 | R134a | R152a | R600a | R600a/R290 (40/60) | SR-10a | SR-10b | SR-10c | SR-10d | SR-10e |
|---|---|---|---|---|---|---|---|---|---|---|
| Cond. Mid Temp. °C. | 54.4 | 54.4 | 54.4 | 54.4 | 54.4 | 54.4 | 54.4 | 54.4 | 54.4 | 54.4 |
| Cond. Mid Press. kpa | 1354 | 1470 | 1312 | 761.4 | 1392 | 1402 | 1395 | 1400 | 1419 | 1375 |
| Inlet (Vapor) T. °C. | 54.4 | 54.4 | 54.4 | 54.4 | 57.31 | 54.51 | 54.47 | 54.42 | 54.46 | 54.9 |
| Outlet (Liquid) T. °C. | 54.4 | 54.4 | 54.4 | 54.4 | 51.52 | 54.29 | 54.33 | 54.38 | 54.33 | 53.9 |
| Δt Condensation °C. | 0 | 0 | 0 | 0 | 5.79 | 0.22 | 0.14 | 0.04 | 0.13 | 1.0 |
| Evap. Mid Temp. °C. | −23.2 | −23.3 | −23.3 | −23.3 | −23.3 | −23.3 | −23.3 | −23.3 | −23.3 | −23.3 |
| Evap. Mid Press. kpa | 132.8 | 114.8 | 104.6 | 62.4 | 136.0 | 132.0 | 130.0 | 131.0 | 131.5 | 129.2 |
| Inlet (L + V) T. °C. | −23.3 | −23.3 | −23.3 | −23.3 | −26.2 | −23.28 | −23.25 | −23.29 | −23.15 | −22.8 |
| Outlet (Vapor) T. °C. | −23.3 | −23.3 | −23.3 | −23.3 | −20.6 | −23.34 | −23.35 | −23.31 | −23.44 | −23.8 |
| Δt Evaporation °C. | 0 | 0 | 0 | 0 | 5.63 | 0.06 | 0.01 | 0.02 | 0.29 | 1.0 |
| Pressure Ratio ($P_c/P_c$) | 10.07 | 12.80 | 12.54 | 12.19 | 10.23 | 10.62 | 10.73 | 10.68 | 10.79 | 10.64 |
| Discharge Temp. °C. | 126.7 | 118.8 | 137.6 | 102.4 | 113.5 | 119.8 | 115.9 | 119.6 | 121.8 | 118.1 |
| $\rho_1$ (Suc. Density) $kgm^3$ | 6.496 | 4.714 | 2.778 | 1.451 | 2.683 | 3.380 | 3.380 | 3.380 | 3.388 | 3.287 |
| Volumetric Capa. $kal/m^3$ | 220.7 | 209.1 | 192.5 | 116.5 | 222.2 | 227.1 | 226.6 | 226.8 | 228.9 | 222.7 |
| Δh (Evap.) Capa. ka/kg | 33.07 | 44.36 | 69.3 | 80.27 | 82.84 | 67.17 | 67.05 | 67.10 | 67.56 | 67.76 |
| COP w/w | 2.71 | 2.73 | 2.69 | 2.89 | 2.71 | 2.78 | 2.77 | 2.78 | 2.77 | 2.77 |

Table 3 shows that the ratios of the volumetric cooling capacity of R600a and R134a to CFC-12 were 47% and 5.2%, respectively. But, the refrigerant mixture (SR-10 Series) according to the present invention had superior volumetric cooling capacity to CFC-12 by 3%. In terms of coefficient of performance (COP), R600a was most excellent and R134a had similar value with CFC-12. The compositions according to the present invention (SR-10 Series) had higher COP than CFC-12 by about 2.5%. Further, the refrigerant mixtures (SR-10 Series) had a condensing and evaporating pressure similar to that of CFC-12. Compressing ratio thereof was about 6.2%, which is higher than CFC-12 and about 14.6% higher than R134a.

Because the compositions according to the present invention (SR-10a to SR-10e) had excellent cooling capacity and high COP, it would be readily understood that they could be wildly used as a refrigerant for low back pressure condition. Especially, the compositions could be directly dropped in the refrigerating systems in which CFC-12 are used as a refrigerant, because they exhibited similar properties with CFC-12 in terms of vapor pressure characteristics. Finally, the compositions showed azeotropic behavior such that the temperature grade during the evaporation and condensation could be reduced.

Example 4

With the equilibrium experimental apparatus composed of an equilibrium apparatus, a tank for recovering refrigerant, and a temperature controller for an equilibrium apparatus, temperature-dependent saturated pressure was measured for the compositions according to the present invention (SR-10 Series). The equilibrium experiment was carried out as follows: the temperature of the thermostat was set to a certain value, and the air inside the refrigerating cycle was removed with vacuum pump such that the pressure thereof was adjusted to $1 \times 10^{-5}$ torr. Liquid compositions of refrigerant mixture were introduced to the equilibrium cell up to ⅓ of its volume. After that, the magnetic pump was operated to mix the compositions and to achieve equilibrium state. Once equilibrium state is achieved, the time-dependent saturated pressure was measured with a temperature sensor and a pressure sensor.

As shown in Table 4, the compositions of refrigerant mixture for low back pressure condition, SR-10a, SR-10b, and SR-10c showed similar vapor pressure characteristics in a low temperature region with CFC-12. Even though there were small gap in the high temperature region, such a gap was proven to be ignorable, compared to R134a.

TABLE 4

| | Refrigerant Pressure (kpa) | | | | |
|---|---|---|---|---|---|
| Temp (° C.) | R12 | R134a | SR-10a | SR-10b | SR-10c |
| 60 | 1516.4 | 1682.1 | 1591.0 | 1578.5 | 1581.5 |
| 55 | 1356.5 | 1490.8 | 1421.0 | 1404.5 | 1407.5 |
| 50 | 1208.4 | 1317.3 | 1265.0 | 1240.0 | 1243.0 |
| 45 | 1074.1 | 1159.4 | 1122.0 | 1106.5 | 1109.5 |
| 40 | 950.5 | 1016.2 | 991.5 | 974.5 | 977.5 |
| 0 | 303.3 | 292.5 | 311.4 | 308.5 | 308.5 |
| −20 | 148.4 | 132.6 | 150.7 | 145.6 | 147.6 |
| −25 | 120.9 | 106.2 | 123.2 | 120.8 | 121.8 |
| −30 | 99.3 | 84.6 | 99.8 | 95.1 | 97.1 |
| −35 | 80.7 | 67.0 | 80.0 | 78.9 | 79.2 |
| −40 | 64.0 | 51.3 | 63.5 | 61.9 | 62.3 |

Example 5

When the second refrigerant calorimeter described on the Korean Industrial Standard (KS B 6365-1987), various capacities for SR-10a, SR-10b, and SR-10c prepared in Example 1 were measured and compared to CFC-12 and HFC-134a that are low back pressure refrigerants. The results thereof were summarized in Table 5.

TABLE 5

The Capacities of the refrigerants from calorimeter under ASHRAE LBP condition

| | Item | | | | | |
|---|---|---|---|---|---|---|
| Refrig. | Capacity (kal/hr) | Input (W) | COP (W/W) | Current (A) | Evap./Cond. Temp. Glide (° C.) | Remark |
| R12 | 196.5 | 159.1 | 1.435 | 0.75 | 0/0 | *Compressor: |
| R134a | 184.2 | 153.7 | 1.392 | 0.74 | 0/0 | PL25 |
| SR-10a | 205.8 | 159.7 | 1.497 | 0.78 | 0.0/0.1 | |
| SR-10b | 203.8 | 158.7 | 1.493 | 0.75 | 0.0/0.1 | * Ref -oil: |
| SR-10c | 204.5 | 158.0 | 1.503 | 0.76 | 0.0/0.03 | Freol S-22T |

As shown in Table 5, the compositions according to the present invention, SR-10a, SR-10b, SR-10c has excellent cooling capacity and high COP, compared to R12 and R134a. As thus, they could be used in the refrigerator systems as a refrigerant composition for low back pressure condition.

Example 6

To a refrigerant mixture consisting of 30 wt % of isobutane and 70 wt % of 1,1-difluoroethane, various amounts of carbon dioxide ($CO_2$) or trifluoromethyl iodide ($CF_3I$) was added, and then, ignition temperature for each composition was measured. The Results thereof were summarized in Table 6. In this experiment, the air was added to the composition in a ratio of 60 vol % because, under such condition, the composition comprising 30 wt % of isobutane and 70 wt % of 1,1-difluoroethane based on the total weight of refrigerant mixture was proven to be most ignitable.

TABLE 6

| Additives | | | | | | | | | | |
|---|---|---|---|---|---|---|---|---|---|---|
| $CF_3I$ | Mixture ratio (weight %) | 0% | 1.5% | 5% | 10% | 20% | 30% | 40% | 50% | |
| | Ignition Temp. (° C.) | 615 | 745 | 850 | 955 | 1050 | 1200 | 1300 | None | |
| $CO_2$ | Mixture ratio (weight %) | 0% | 1.5% | 5% | 10% | 20% | 30% | 40% | 50% | |
| | Ignition Temp. (° C.) | 615 | 725 | 830 | 925 | 1020 | 1170 | 1260 | None | |

As shown in Table 6, the ignition temperature was remarkably increased by the addition of carbon dioxide ($CO_2$) or trifluoromethyl iodide ($CF_3I$). However, as the amount added exceeds 5 wt %, cooling capacity and COP might be reduced. Therefore, it is desirable to add these additives less than 5 wt %.

Example 7

To test the reliability of the refrigerator system in which the compositions according to the present invention, SR-10a, SR-10b, and SR-10c, used as a refrigerant, reliability evaluating experiment with a compressor was performed according to the standard of GE company in US. The results thereof were shown in Table 7:

TABLE 7

| | | Refrigerant Compressor Freezer oil | | | | |
|---|---|---|---|---|---|---|
| | Item | R12 PL25 Mineral (Freol S-22T) | R-134a PL25 Ester (Freol a-22T) | SR-10a | SR-10b PL25 Mineral (Freol S-22T) | SR-10c |
| Ref. Oil | Wear | No | No | No | No | No |
| | Color (ASTM) | L0.5 | L0.5 | L0.5 | L0.5 | L0.5 |
| | TAN (0.1↓) (mgKOH/g) | 0.008 | 0.010 | 0.005 | 0.006 | 0.004 |
| | Water (20 ppm↓) | 0 | 0 | 0 | 0 | 0 |

As shown in Table 7, the compositions, SR-10a, SR-10b, and SR-10c, exhibited very high compatibility with various refrigerating oils, especially with a mineral oil (Freol S-22T, trade mark). Further, abrasive characteristic of the compositions in both valve and friction parts of the machine was proven to be almost identical with that of CFC-12.

INDUSTRIAL APPLICABILITY

The compositions of refrigerant mixture for low back pressure condition according to the present invention can substitute CFC-12 refrigerant in which the use thereof are highly restricted for being a harmful material to environment according to the Montreal protocol. Further, they can be directly dropped in the refrigerating systems in which CFC-12 was used as a refrigerant without any systemic change or modification such that the cost required for the manufacture of refrigerating systems could be highly reduced. The advantages of the compositions according to the present invention is as follows: a) Low evaporating temperature under atmospheric pressure; b) Equal or similar level of condensing/evaporating pressure compared to CFC-12; c) Excellent latent evaporating heat; d) Low condensing point; e) Excellent volumetric cooling capacity; f) High critical temperature; g) Excellent compatibility with the refrigerating oil; h) Low viscosity and high heat transferring characteristic; i) Excellent electric insulation property without the deposit of electric insulating material; j) Remarkably increased non-flammability and non-explosiveness; k) safety to environment and human; and l) Direct applicability to the refrigerating systems adopting CFC-12 refrigerant without any systemic change.

What is claimed is:

1. A refrigerant composition for use in low back pressure condition containing a refrigerant and a positive addition of an additive, wherein a) the refrigerant is a mixture of isobutane and 1,1-difluoroethane, the content of the isobutane is in an amount of 25~35 wt %, the content of the 1,1-difluoroethane is in an amount of 65~75 wt % and the sum of the isobutane and the 1,1-difluoroethane is 100 wt % based on the total weight of the refrigerant, b) the additive is selected from the group consisting of carbon dioxide ($CO_2$), trifluoromethyl iodide ($CF_3I$) and mixture thereof which prevents flammability of the isobutane, the content of the additive is in an amount of less than 5 wt % based on the refrigerant, and c) the refrigerant composition shows an azeotropic behavior.

2. The refrigerant composition as set forth in claim 1, wherein, based on the total weight of the refrigerant composition, the content of the isobutane is 29~31 wt %, the content of the 1,1-difluoroethane is 68~70 wt % and the content of the additive is 1~2 wt %.

3. A refrigerator system, comprising the refrigerant composition of claim 1.

* * * * *